United States Patent [19]
Arnoldt et al.

[11] Patent Number: 5,135,270
[45] Date of Patent: * Aug. 4, 1992

[54] APPARATUS FOR CONNECTING THE ENDS OF A PAIR OF OVAL DUCT SECTIONS

[75] Inventors: Peter J. Arnoldt, Clairton; Frederick J. Arnoldt, Bethel Park, both of Pa.

[73] Assignee: Ductmate Industries, Inc., Monongahela, Pa.

[*] Notice: The portion of the term of this patent subsequent to Jul. 14, 2009 has been disclaimed.

[21] Appl. No.: 394,623

[22] Filed: Aug. 16, 1989

Related U.S. Application Data

[63] Continuation-in-part of Ser. No. 387,338, Jul. 28, 1989, and a continuation-in-part of Ser. No. 218,807, Jul. 13, 1988, which is a continuation-in-part of Ser. No. 205,305, Jun. 10, 1988.

[51] Int. Cl.⁵ ............................................. F16L 23/00
[52] U.S. Cl. ...................................... 285/363; 285/424
[58] Field of Search .............. 285/368, 331, 412, 424, 285/176, 363

[56] References Cited

U.S. PATENT DOCUMENTS

| | | | |
|---|---|---|---|
| 1,774,151 | 8/1930 | Olley | 285/176 X |
| 2,628,851 | 2/1953 | Jessup | 285/176 X |
| 3,544,137 | 12/1960 | Contreras et al. | 285/424 X |
| 3,630,549 | 12/1971 | Grimm | 285/297 |
| 3,695,636 | 10/1972 | Graves | 285/424 X |
| 3,920,271 | 11/1975 | Bluestone | 285/176 |
| 4,123,094 | 10/1978 | Smitka | 285/424 X |
| 4,218,079 | 8/1980 | Arnoldt | 285/424 X |
| 4,288,115 | 9/1981 | Sullivan | 285/424 X |
| 4,447,079 | 5/1984 | Sullivan | 285/424 X |
| 4,537,430 | 8/1985 | Sullivan | 285/424 X |
| 4,662,661 | 5/1987 | Arnoldt | 285/424 X |
| 4,765,375 | 8/1988 | Nakajima | 285/424 X |

FOREIGN PATENT DOCUMENTS

| | | |
|---|---|---|
| 2434160 | 1/1976 | Fed. Rep. of Germany . |
| 2758295 | 6/1979 | Fed. Rep. of Germany . |
| 2098691 | 11/1982 | United Kingdom ............. 285/412 |

OTHER PUBLICATIONS

Thor Metal Products Co. Inc. Brochure of Gas Vent Pipe and Fittings (Round & Oval), May 24, 1961.
Titan Steel Publication, "Titan PDQ Round Duct Flange Rings", (no date given).

*Primary Examiner*—Dave W. Arola
*Attorney, Agent, or Firm*—Stanley J. Price, Jr.

[57] ABSTRACT

Apparatus for connecting the ends of a pair of oval duct sections includes a pair of arcuate frame sections and a pair of linear intermediate frame sections that are connected to each other by connector pieces having leg portions extending into receivers in the profile of the frame sections. The connector pieces have stop members which abut the edges of the frame sections and provide a gap therebetween. The lower stop member is offset rearwardly from the body portion of the connector piece and the edge portion of the oval duct extends outwardly into the gap portion. The oval duct end portions are connected to the duct connector frame members and pairs of frame members are positioned in adjacent relation with a gasket member therebetween. The connecting members include a securing device to secure the adjacent frame members to each other and exert a compressive force on the gasket member therebetween. Portions of the gasket member at the gaps are distorted into abutting and sealing relation with the front edge of the duct in the gap.

18 Claims, 5 Drawing Sheets

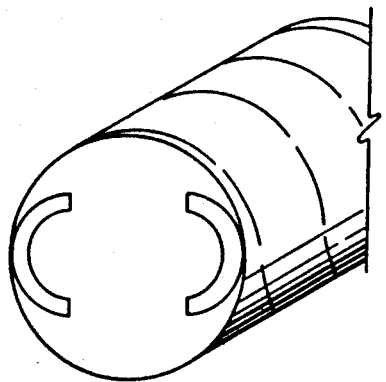
FIG. 1 PRIOR ART
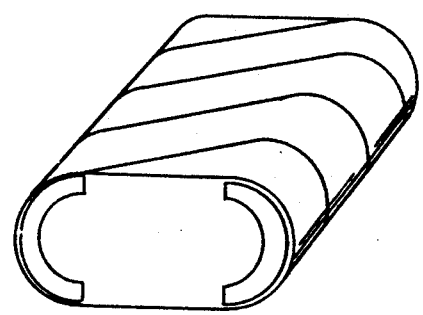
FIG. 2 PRIOR ART
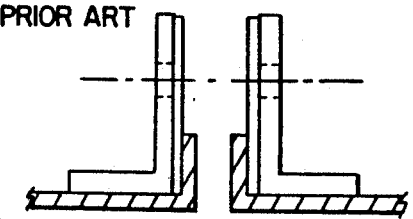
FIG. 6 PRIOR ART
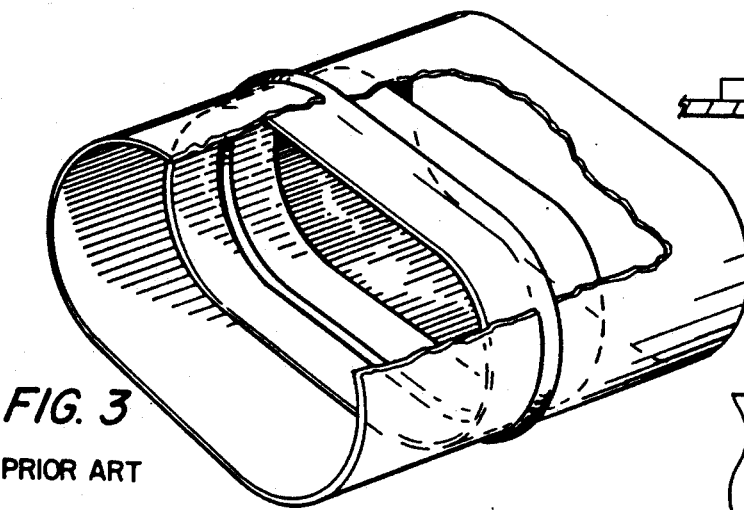
FIG. 3 PRIOR ART
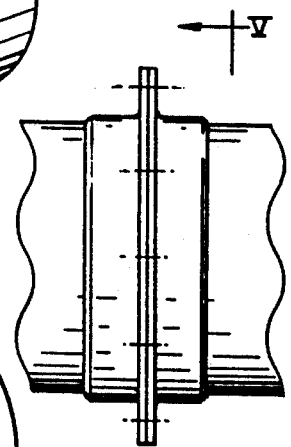
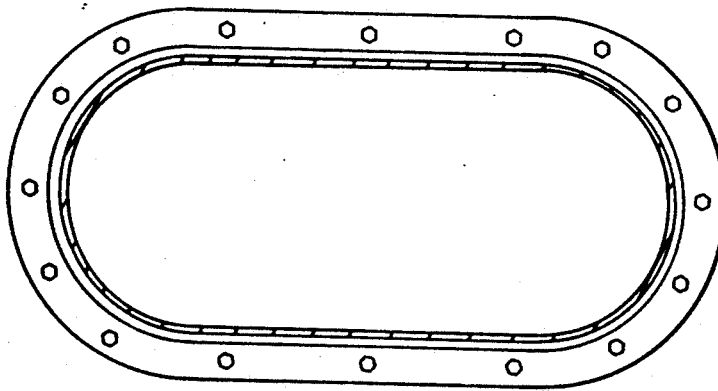
FIG. 4 PRIOR ART
FIG. 5 PRIOR ART
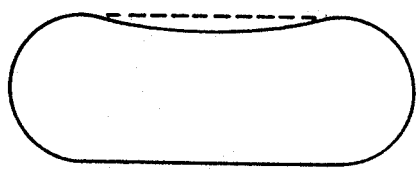
FIG. 7 PRIOR ART
FIG. 8 PRIOR ART

APPARATUS FOR CONNECTING THE ENDS OF A PAIR OF OVAL DUCT SECTIONS

CROSS-REFERENCE TO RELATED APPLICATIONS

This application is a continuation-in-part of U.S. application Ser. No. 387,338 entitled "Improved Duct Connector" filed Jul. 28, 1989, and a continuation-in-part of U.S. application Ser. No. 218,807 entitled "Circular Duct Connector" filed Jul. 13, 1988, which in turn is a continuation-in-part of U.S. application Ser. No. 205,305 entitled "Duct Connector For A Circular Duct" filed Jun. 10, 1988.

BACKGROUND OF THE INVENTION

1. Field of the Invention

This invention relates to a method and apparatus for connecting the ends of a pair of oval duct sections and more particularly to a duct joint frame assembly for connecting the ends of oval ducts that includes a plurality of frame sections with connecting end portions and connector pieces connecting the frame sections to provide a gap therebetween.

2. Description of the Prior Art

It is well known to connect the ends of adjacent rectangular heating and air-conditioning ducts by a joint assembly secured to the ends of the adjacent duct members.

U.S. Pat. No. 3,415,543 discloses a hollow coupling frame for connecting a pair of rectangular duct sections. The frame includes a pair of reversely folded legs on one side thereof which define oppositely disposed channels for receipt of the sections to be joined. The legs end in angularly related laterally disposed locking lips, which extend back toward the legs to engage and lock the sections within the channels.

U.S. Pat. No. 3,630,549 discloses a duct joint connector for rectangular ducts which includes a rectangular inner frame positioned between adjacent rectangular ducts so that the duct ends abut the frame. The rectangular ducts are secured to the frame by means of external cleats. The corners of the rectangular frame are enclosed by end caps, and mastic may be pumped into the frame to seal air gaps between the ducts and the frame.

U.S. Pat. No. 4,046,409 discloses an arrangement for joining rectangular ventilation ducts. A first and second member are connected with a first duct end and a second duct end, respectively. The second member is provided with an upright stiffening leg and a horizontal leg terminated by a hook-shaped member, which can be snapped over a raised edge of the first member. The first member comprises a horizontal lip which is received by the second member.

U.S. Pat. No. 4,410,206 discloses a flange connection for rectangular air-conditioning ducts. The flange connection includes eight pieces of open-sided box girder, four of which are slipped onto and fixed to each of two rectangular ducts to form frame thereon. The two frames are then bolted together. Angle pieces are inserted into the frames at the corners and bolted to the frames to produce the desired sealing force between the frames.

U.S. Pat. No. 4,508,376 discloses a flange type duct joint assembly that includes a pair of frame members secured to the ends of adjacent rectangular ducts. The frame members have flange portions secured to each other by angular corner pieces having rearwardly curved or displaced flange portions operable to facilitate an air-tight seal between the ends of the duct sections and the frame members.

U.S. Pat. No. 4,509,778 discloses a duct joint assembly for sealingly connecting the ends of a pair of rectangular sheet metal duct sections that include clamps for both connecting adjacent corner pieces which are part of the joint assembly and exerting sealing forces upon the corner pieces.

Assemblies for use in connecting the ends of rectangular ducts are also disclosed in the U.S. Pat. Nos. 4,542,923 and 4,558,892. The duct assemblies disclosed in these patents each include a plurality of individual frame members secured to the ends of adjacent rectangular ducts. Angular corner pieces are inserted into the ends of adjacent frame members, and the adjacent frame members on opposing duct ends are secured together by means of a clamp.

U.S. Pat. No. 4,566,724 discloses a duct joint frame for connecting rectangular duct sections that includes a plurality of flange members positioned oppositely of one another on the ends of the pair of generally rectangular ducts. Each flange member includes a stop arranged to engage a plurality of protuberances on the inner surface of the duct adjacent the duct end portion to prevent retraction of the duct end portion from the flange member. Angular corner pieces extend into the ends of the flange members to connect adjacent flange members and form a frame around the respective duct end portions.

Assemblies for connecting the ends of rectangular duct sections are also disclosed in West German Patent Nos. 2,434,160 and 2,758,295. The assemblies disclosed in these patents each include a plurality of frame members which are slipped onto the ends of the opposing duct sections, and corner pieces which are inserted into the adjacent frame members on each duct. The corner pieces are bolted together to connect the adjacent duct sections.

Although the above listed patents each disclose apparatus for connecting generally rectangular duct sections, it is also known to provide apparatus for connecting the ends of generally circular duct sections.

U.S. Pat. No. 3,512,805 discloses a flexible strip for connecting the ends of generally circular ducts. The flexible strip includes a pair of longitudinal grooves adapted to receive the ends of the circular ducts therein. Protuberances on the outside surfaces of the circular ducts engage the longitudinal grooves to prevent retraction of the circular ducts from the strip after assembly.

U.S. Pat. No. 3,791,681 discloses a device for establishing a sealing connection between the ends of tubular members. The ends of the tubular members are bent outwardly, and a sealing member is positioned between the outwardly bent ends of the adjacent tubular members. A connecting strip having a substantially U-shaped cross section is forced over the outwardly bent ends of the tubular members to clamp the tubular member ends against the sealing member.

U.S. Pat. No. 4,418,948 discloses an elastic coupling for joining two pipes or tubes carrying a pressurized fluid. The coupling includes a plurality of elastic ring segments each having an annular cross section and a clamping collar. The pipes or tubes to be connected each include an outwardly extending rim or flange around the circumference of the edge of the pipe. The pipe flanges are arranged to receive the elastic ring segments. After the elastic ring segments are placed in surrounding relationship with the pipe flanges, the clamping collar is clamped down into contact with the ring segments causing the cross section of the ring segments to contract. As the ring segments contract, the pipe flanges are moved towards one another to compress a seal disposed intermediate the two flanges.

U.S. Pat. No. 4,516,797 discloses a flanged ring for connecting sheet metal tube sections. Each flanged ring includes a securing flange which protrudes radially outwardly from the tube section, an arm projecting from the inner end of the securing flange and a ring portion bent obliquely outward from the arm toward the securing flange. The outer diameter of the ring land is selected such that when it is driven into the end of the tube, it is prestressed and thus produces a joint between the flanged ring and the tube. To connect a pair of sheet metal tube sections, a pair of flanged rings are secured to the ends of adjacent circular ducts, and the securing flanges of the adjacent flanged rings are fixed firmly to one another by means of a screw connection, clamp or the like. A German publication identified as "Metu System 61" illustrates a flange ring for connecting the ends of circular metal duct and is similar to the disclosure of U.S. Pat. No. 4,516,797. There is also a Canadian publication by Titan Steel Corporation which illustrates a similar product.

An oval duct is formed from a circular duct having either a spiral seam or a longitudinal seam that is grooved or welded. The circular duct is formed, in sections of a preselected length. To form an oval duct from a circular duct, illustrated in FIG. 1, a pair of elongating dies are positioned in the circular duct. The dies have an arcuate configuration which has a semi-circular dimension that determines both the height and the width of the oval duct. In fabrication, the semi-circular dies of a preselected size are moved away from each other, as illustrated in FIG. 2, to form the oval duct with the preselected transverse dimension including the height and width and the preselected arcuate end portions. It will be appreciated that the transverse dimensions of each of the oval duct sections will vary within limits due to the manner in which the circular spiral or longitudinal seam ducts are formed and the manner in which the circular ducts are deformed to form the oval ducts.

As illustrated in FIG. 3, sections of the oval duct have been connected in the past by means of an oval coupling positioned within the end portions of the oval duct sections. It is also known to provide a deep drawn beveled portion on the oval coupling to serve as a reinforcing means for the ends of the ducts and the coupling.

It is also known to connect oval duct sections by means of oval L-shaped flanged members secured to the ends of the oval ducts and the flanged members connected to each other by a plurality of bolts extending through apertures in the upstanding legs of the oval flange connectors as illustrated in FIGS. 4 and 5.

FIG. 6 illustrates another known coupling member for oval duct sections wherein the edges of the oval ducts are flanged outwardly and L-shaped flanged members are slidingly fitted over the duct and are not fastened to the ducts. Gaskets are positioned between the upstanding flange portions of the connectors and the upstanding flange portions of the ducts. The flanged connectors are bolted to each other with the flanged edge portions of the ducts therebetween. This type of connector is known as the "Vent stone" flange. The Vent stone flange is usually used with ducts fabricated from expensive material such as stainless steel and the like. Conventional steel L-shaped flanges can be used without compromising the interior stainless steel integrity of the duct. The above described known connectors for oval ducts require relatively accurate dimensions of the oval duct sections and substantial amounts of gasket and mastic gasket material to minimize leakage at the connections.

Another problem present with oval ducts is the distortion of the duct due either to the weight of the duct or the distortion of the duct by the pressure of the gas within the ducts. In FIG. 7, the distortion by the weight of the ducts is illustrated and in FIG. 8, the distortion by gas pressure is illustrated. It is desirable to provide a rigid connector for the ducts to minimize the distortion of the duct as illustrated in FIGS. 7 and 8 from breaking the seal at the connectors so that leakage does not occur at those locations.

There is a need for a duct connector for oval ducts which provides an airtight seal for the end portions of the oval duct sections and compensates for the variations in the dimensions of the oval duct and also provides rigidity and support for the end portions of each section so that the sections of oval ducts connected by the oval duct connectors are provided with a rigid frame-like support to minimize the distortions as illustrated in FIGS. 7 and 8.

SUMMARY OF THE INVENTION

This invention relates to apparatus for connecting the end portions of a pair of oval duct sections in which the duct connector has a plurality of frame sections with connecting end portions. Connector pieces are arranged to connect the connecting end portions to form a frame having an oval configuration. The connector pieces have a body portion and stop means on the body portion to connect the end portions in spaced relation and form a gap therebetween. The frame is connected to the end of a duct with a portion of the edge of the duct extending into the gaps formed by the stop means on the connector pieces.

The frame may be formed from a pair of arcuate frame end sections and a pair of intermediate linear sections. The connector piece preferably has a body portion and a pair of legs extending therefrom and a stop means formed on the body portion. In the preferred embodiment, a portion of the stop means is offset from the body portion in the gap to permit the gasket between adjacent frames to sealingly engage the edge portion of the duct in the gap. Suitable securing means are connected to the body portion of the connector piece to connect the adjacent oval duct sections to each other. Other clamping means may be used to further secure the frames to each other.

The invention also includes a method for connecting the end portions of a pair of oval duct sections by forming a pair of duct frames having an oval configuration from a plurality of frame sections and a plurality of connector pieces. Gaps are formed in the duct frame at the connector pieces. The frames are secured to the edge portion of an oval duct with portions of the duct edge portion extending into the gaps. A gasket member is positioned between the duct frames and the duct frames are urged toward each other to compress the gasket member therebetween so that portions of the gasket member extend into the gaps and sealingly engage the edge of the duct.

Accordingly, the principal object of the present invention is to provide a method and apparatus for connecting the end portions of a pair of oval ducts by a pair of frame members having a plurality of frame sections with end portions and connector pieces providing a gap between the end portions of the adjacent frame sections.

Another object is to provide an oval duct connector frame having a plurality of gaps for receiving a portion of the oval duct edge.

A still further object is to provide an oval duct connector frame having a connector piece with a body portion and stop means for the ends of the adjacent frame section end portions with a portion of the stop means offset to permit the edge of the duct to extend beyond the stop means.

These and other objects of the present invention will be more completely disclosed and described in the following specification, the accompanying drawings and the appended claims.

BRIEF DESCRIPTION OF THE DRAWINGS

FIG. 1 is a schematic isometric view of a circular spiral seam duct with a pair of elongating dies positioned therein.

FIG. 2 is a view similar to FIG. 1 illustrating the elongating dies in an extended position and forming an oval duct from the circular duct illustrated in FIG. 1.

FIG. 3 is a fragmentary isometric view with portions broken away and illustrating a conventional connector that is positioned within the end portions of the oval duct sections and an outwardly extending reinforcing bead portion on the connector.

FIG. 4 is a view in side elevation illustrating conventional L-shaped flange members secured to the outer surface of the oval duct sections.

FIG. 5 is a view in front elevation taken along the lines V—V in FIG. 4.

FIG. 6 is a fragmentary view in section illustrating another prior art oval duct connector in which each of the oval duct end portions has a small flange extending upwardly therefrom with L-shaped flange members fitting over the duct and gasket members positioned between the upturned duct flanges.

FIG. 7 is a schematic view illustrating the sagging upper surface of a relatively wide oval duct section.

FIG. 8 is a schematic view illustrating a relatively wide oval duct under pressure with the upper and lower surfaces bulging outwardly.

DESCRIPTION OF THE PREFERRED EMBODIMENTS

Figure 9:
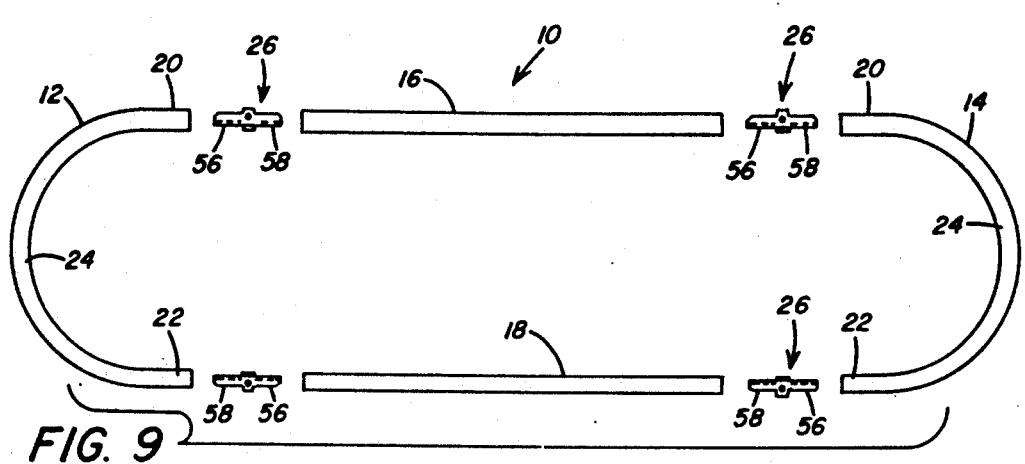
FIG. 9 is an view in front elevation of the oval duct connector illustrating the arcuate frame end portions spaced from the linear intermediate frame portions with the connector pieces therebetween.

Referring to the drawings, FIGS. 1–8 illustrate the manner in which oval duct sections are formed from circular duct sections, prior art connectors for the oval duct sections and the manner in which the oval duct sections are distorted by the weight of the duct and the pressures of the gas within the duct.

Figure 10:
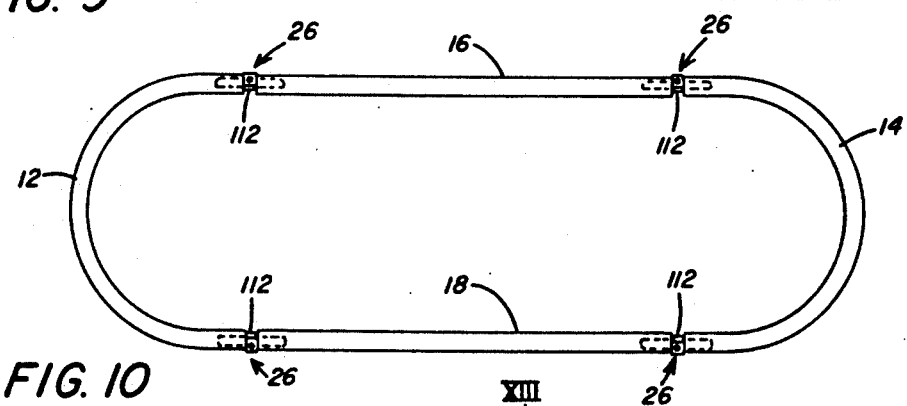
FIG. 10 is a view similar to FIG. 9 with the arcuate frame end portions and the straight linear frame portions connected by the connector pieces and in abutting relation with the stop means on the respective connector piece with gaps between the arcuate end flange portions and the straight linear flange portions.

FIGS. 9 and 10 illustrate a preferred embodiment of an oval duct connector frame of this invention that is generally designated by the numeral 10. The frame 10 includes a pair of arcuate end sections 12 and 14 and a pair of intermediate straight sections 16 and 18. The arcuate end sections 12 and 14 each have straight or linear end portions 20 and 22 and a semi-circular intermediate portion 24. As will be discussed in greater detail, the end sections 12 and 14 are connected to the intermediate sections 16 and 18 by a plurality of connector pieces generally designated by the numeral 26. The end sections 12 and 14 preferably have a profile similar to that of the straight sections 16 and 18 and the profile, as later discussed, has receivers for the legs of the connector piece 26. It is therefore desirable that the end sections 12 and 14 each have linear end portions 20 and 22 to receive the leg portions of the connector piece 26.

Figure 11:
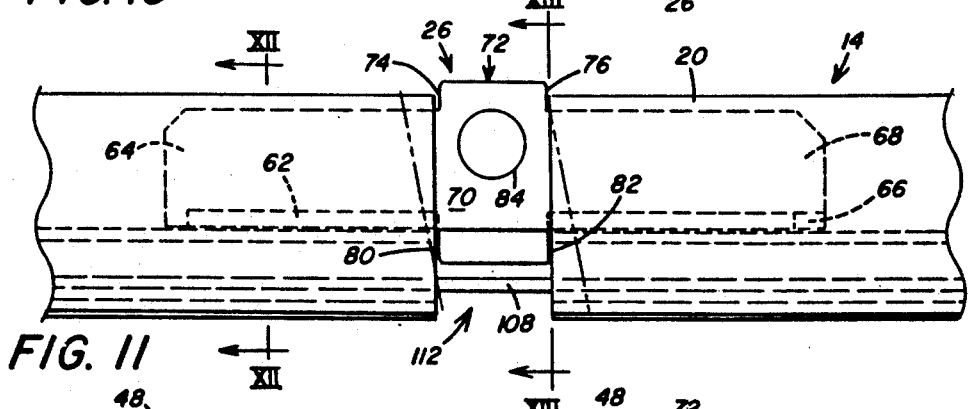
FIG. 11 is a fragmentary view in front elevation of a connector piece and the edge portions of the linear frame straight portion and arcuate frame portion. The dash-dot lines indicate how the means on the connector piece are arranged to engage nonperpendicular edges of the respective frame end portions.

FIG. 10 illustrates the manner in which the arcuate frame portions 12 and 14 are connected to the linear or straight portions 16 and 18 by means of a plurality of connector pieces 26 with the legs of the connector pieces inserted into the profile of the frame sections. FIG. 11 is an enlarged view of a connector piece 26 connecting the end portions of frame sections, as for example, the end portion 20 of arcuate frame section 14 and straight frame section 16. The dash-dot lines in FIG. 11 are intended to illustrate end portions of the frame sections that are cut at an angle other than perpendicular to the longitudinal axis of the frame section and the manner in which the bottom and top stop members abut the non-perpendicular end portions of the frame sections.

Figures 12, 13:
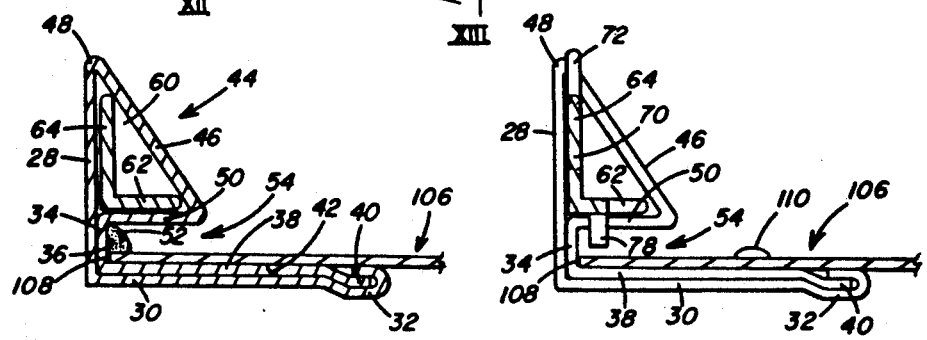
FIG. 12 is a view in section taken along the line XII—XII in FIG. 11 with the L-shaped leg of the connector piece positioned in an opening in the profile of the frame and the duct end portion positioned on the upper surface of the frame flange portions.
FIG. 13 is a view in section taken along the line XIII—XIII in FIG. 11 illustrating the depending offset stop portion on the connector piece and the upstanding stop portion on the connector piece.

The frame member arcuate sections 12 and 14 and the linear sections 16 and 18 all have substantially the same configuration and are rolled from a flat piece of thin guage metal by a roll former. The sections of the frame 10 have a profile which is illustrated in section in FIGS. 12, 13, 15 and 16. Referring to FIG. 12, the frame sections have an inner vertical wall 28 with a horizontal bottom flange 30. The flange portion 30 extends angularly from the inner vertical wall 28 and has a downturned rebent end portion 32 that is bent downwardly, as illustrated in FIGS. 12 and 13. The frame member sections also have an outer vertical wall 34 with an outer vertical surface 36 and a horizontally extending top flange 38. The flange 38 extends angularly from the outer vertical wall 34 and has a downturned end portion 40 which extends into the downturned rebent portion 32 of the bottom flange 30. The horizontal bottom flange 30 and horizontal top flange 38 are in abutting relation and the end 40 of top flange 36 is clampingly engaged in the downturned rebent portion 32. The horizontal top flange 38 has a top surface 42 which is a substantially planar surface as viewed in section in FIG. 12. It should be understood that the arcuate end sections have arcuate portions of the frame with the planar top surface 42 of top flange 38 in a flat arcuate plane and as later described, is positioned with the undersurface of the duct end portion in abutting relation therewith.

The frame sections have a rigidifying portion generally designated by the numeral 44 with an outwardly sloped or inclined leg 46 connected at one end to the inner vertical wall 28 at the top portion 48. The opposite end of the inclined portion 46 is connected to an inturned wall 50 which joins the outer vertical wall 34. The rigidifying means 44 has a generally triangular configuration with the leg 46 having a preselected slope and the inturned wall 50 spaced from the duct wall to permit either the grooved or welded seam or the spiral seam of the duct to fit therebetween. The inclined leg 46, the inturned wall 50 and the outer vertical wall 28 form a triangular opening 60.

As later discussed, the frame sections are secured to the end portion of the duct and a mastic material 52 is positioned in a pocket generally designated by the numeral 54 to seal the edge portion of the duct and also to receive the spiral or welded seam of the oval duct.

Figure 14:
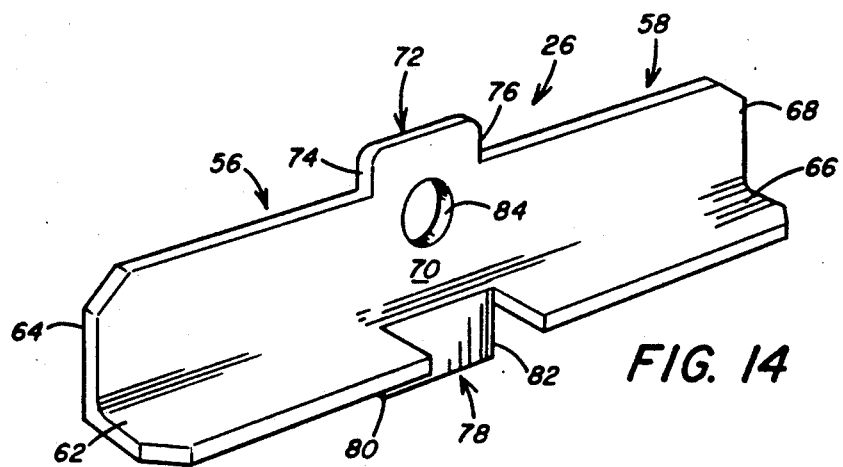
FIG. 14 is an isometric view of the connector piece with the depending offset stop portion and the upstanding leg stop portion.
Figure 15:
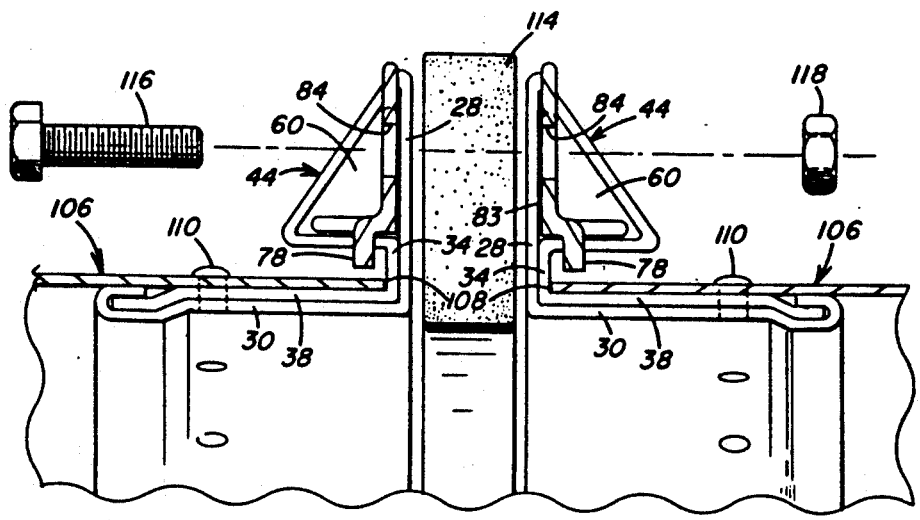
FIG. 15 is a fragmentary view of a pair of oval duct sections similar to that illustrated in FIGS. 12 and 13 illustrating a gasket therebetween and the edge of the duct projecting beyond the depending offset stop portion of the connector piece.
Figure 16:
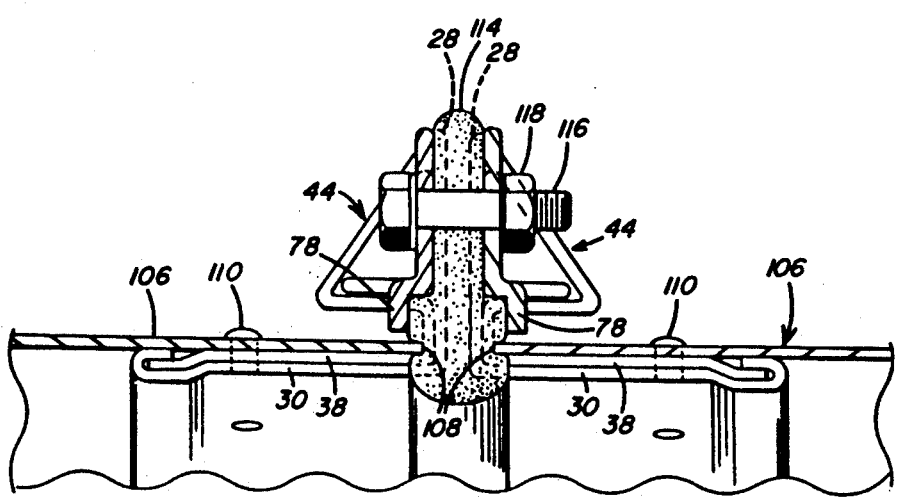
FIG. 16 is a view similar to FIG. 15 illustrating the duct end portions connected to each other by the nut and bolt assembly with the gasket compressed therebetween and the exposed edge portion of the duct projecting into the gasket member.
Figure 25:
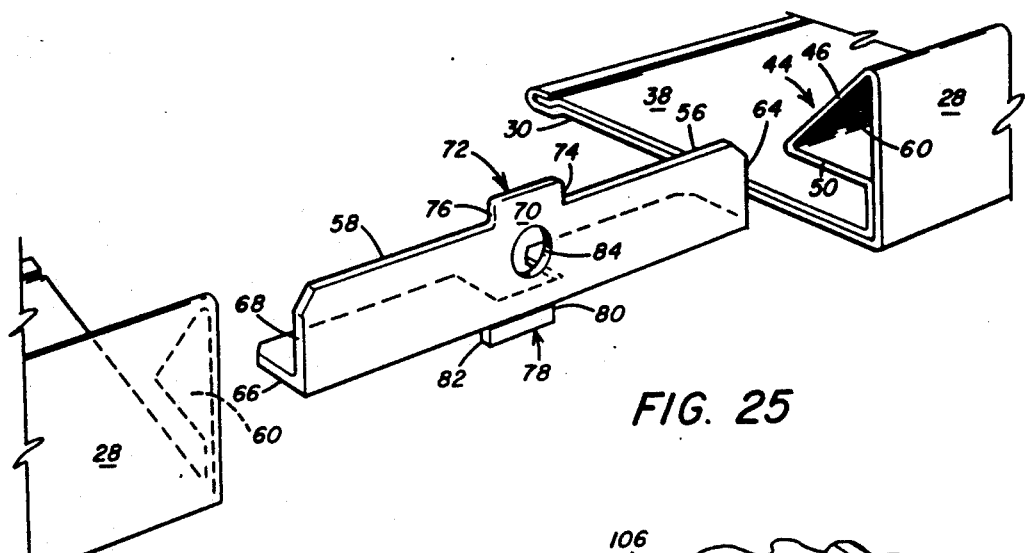
FIG. 25 is a fragmentary isometric view of adjacent portions of the duct connector frame with the connector piece therebetween.
Figure 26:
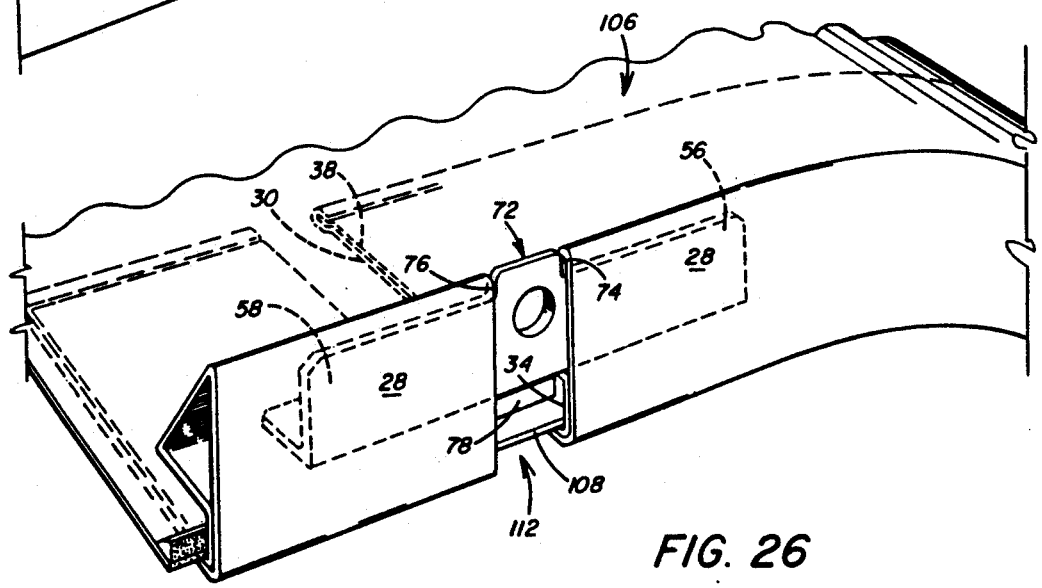
FIG. 26 is a view similar to FIG. 25 with the end portions of the frame in abutting relation with the upstanding and depending stop members and with the edge of the duct in the gap formed by the connector piece stop portion and extending outwardly beyond the lower offset depending stop portion.

Referrring to FIGS. 14, 25 and 26, the connector piece 26 and the manner in which the connector piece connects the respective sections to each other are illustrated. The connector piece has a generally angular configuration with a body portion 70 and a pair of legs 56 and 58 extending therefrom. The legs 56 and 58 are arranged to extend into the triangular openings or spaces 60 in the respective frame sections. The leg 56 has a generally L-shape with horizontally extending portion 62 and an upwardly extending portion 64. Similarly, the other leg 58 has a horizontally extending portion 66 and an upwardly extending portion 68. An upper stop member 72 extends upwardly from the body portion 70 between the legs 56 and 58. The stop member 72 has vertical edge portions 74 and 76 which serve as stops for the frame member end portions as later discussed. The body portion 70 has a downwardly extending stop member 78 which also has vertical edge portions 80 and 82 which serve as stops. The stop member 78 is preferably formed from the horizontal portion of the body 70 between the legs 56 and 58. It should be understood, however, that a separate downwardly extending stop member 78 could be fixedly secured to the underside of an angularly shaped body portion. The stop member 78, as illustrated in FIGS. 15 and 16, is displaced rearwardly from the front surface 83 of the connector piece body portion 70. The rearward displacement of the front surface 83 is preferably greater than the metal thickness of the inner vertical wall 28 and outer vertical wall 34. The connector body portion 70 has an aperture 84 therein for connecting the connector frames 10 to each other.

Figure 23:
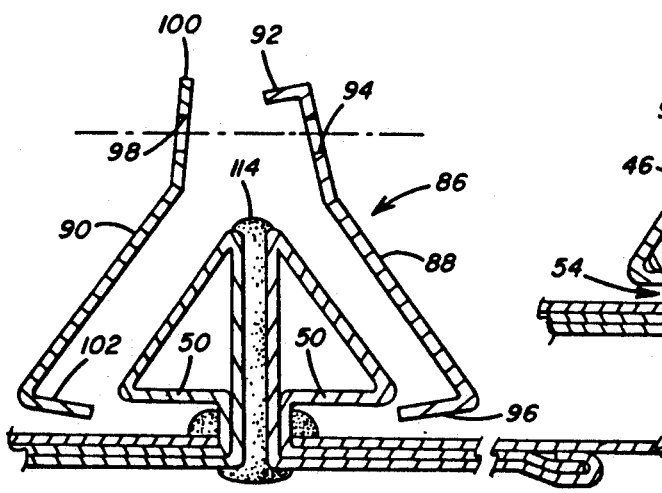
FIG. 23 is a view in section of the clamp in a relaxed expanded position.
Figure 24:
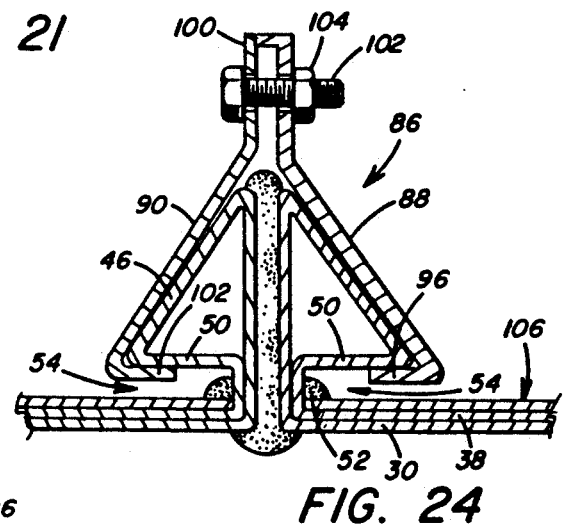
FIG. 24 is a view similar to FIG. 23 with the clamp sections secured to each other and urging portions of the oval duct connector frames toward each other.
Figure 22:
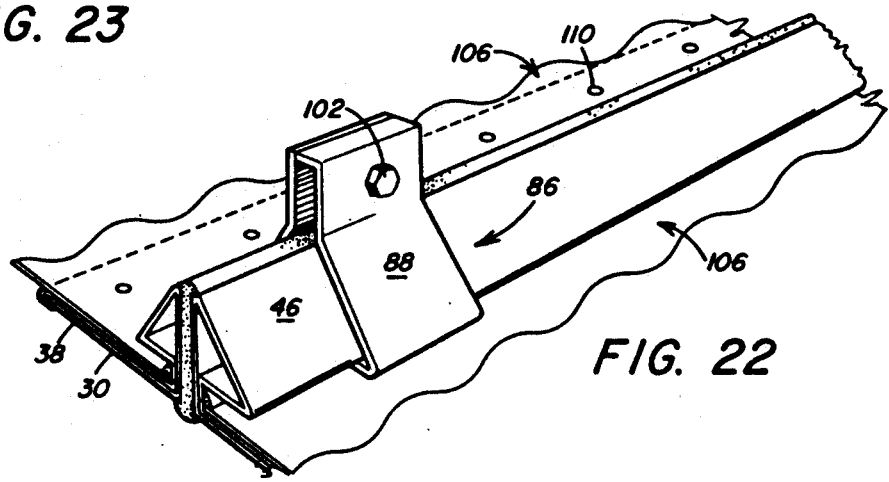
FIG. 22 is an isometric view of a portion of a pair of oval duct connector frames with a clamp positioned therearound.

FIGS. 22-24 illustrate a clamp generally designated by the numeral 86 which is arranged to clampingly engage and urge abutting frame members 10 toward each other and may be positioned anywhere around the periphery of the frames as required including the arcuate end sections 24.

The clamp 86 includes a first member 88 and a second separate member 90. The member 88 has an inturned top flange portion 92 and a bolt aperture 94. The lower portion of member 88 has an inturned flange 96 which is arranged to extend under the inwardly extending portion 50 into the pocket 54. Similarly, the second portion 90 has a bolt aperture 98 and an upper edge portion 100. The second portion 90 has a lower inturned flange 102 which is arranged to extend beneath the outwardly extending portion 50 into the pocket 54 formed in the reinforcing member 44. A bolt 102 extends through the respective apertures 94 and 98 and the portions 88 and 90 are tightened around the frames rigidifying portions 44 by means of a nut 104. The edge 100 of portion 90 serves as a fulcrum for the inturned flange 92 of portion 98 to clampingly urge the portions 88 and 90 toward each other around the respective frame rigidifying portions 44.

Referring to FIGS. 9-13, the method for assembling the frame 10 includes positioning the legs 56 and 58 into the openings 60 of the linear end portions 20 and 22 of arcuate sections 12 and 14 as illustrated in FIGS. 12 and 13. The other leg portions 56 and 58 are positioned in the openings 60 of the end portions of the linear members 16 and 18 to form a frame structure. As illustrated in FIG. 11, the edge portions of the frame sections 14 and 16 are moved into abutting relation with the upper stop 72 and the lower stop 78 until the edges of the frame sections 14 and 16 abut the edges 74 and 76 of upper stop 72 and the lower edges 80 and 82 of the lower stop 78. It should be understood when the edges of the frame sections 14 and 16 are cut at an angle other than perpendicular as illustrated in FIG. 11, an edge portion of the respective frame will abut either the upper or lower edges of the stop members 72 and 78.

Because of the angular configuration, the legs 56 and 58 fit snugly into the opening 60 in the profile of the respective frame sections and rigidly connect the respective frame section end portions with the surfaces of the legs abutting the inner wall of the inner vertical wall 28 and the upper surface of the inturned wall 50. With this arrangement, the end portions of the respective frames, as for example, 14 and 16, are linearly and rigidly connected to each other by means of the connector piece 26.

The frame member 10 after assembly is then positioned on the oval duct, an end portion of which is illustrated in FIGS. 13, 15 and 16. Adjustments in the dimensions of the assembled frame member may be made to accommodate the variations in dimensions of the oval duct by moving the arcuate frame end portions 12 and 14 relative to the linear frame portions 16 and 18. The versatility of connecting oval ducts having different widths will be apparent in that the linear sections 16 and 18 are cut to lengths to accommodate an oval duct of a preselected width.

The end portion of the oval duct is generally designated by the numeral 106 and has a front edge portion 108. The duct is positioned on the upper surface 42 of the profile top flange 38 and is moved into abutting relation with the surface of the outer vertical wall 34 (FIGS. 13 and 14). Suitable securing means, such as a rivet, metal screw weld or the like designated by the numeral 110, fixedly secures the duct end portion 106 to the frame section through the top flange 38 and bottom flange 30. The duct edge portion 108 is moved into abutting relation with the outer surface of outer vertical wall before it is secured to the respective flange portions 30 and 38 and the mastic material 52 is positioned in the pocket 54 to seal the duct edge 108. With this arrangement, the duct end portion 106 is secured to the assembled duct connector frame 10.

As illustrated in FIG. 13, the depending stop member 78 is displaced rearwardly from the vertical portion of the connector piece body portion 70 and the upper stop member 72 extends in the same plane as the body portion 70. FIGS. 11 and 13 illustrate the manner in which the duct edge portion 108 is spaced downwardly from the lower edge of the lower stop member 78.

As shown in FIGS. 13, 15 and 26, the duct edge 108 extends forwardly from the lower stop member 78 and abuts against the outer vertical wall 34. A gap 112 is formed between the edges of the connector piece 26 by the stop members 72 and 78. The gap 112 and the offset stop portion 78 permits the duct edge portion to be exposed and sealed by a gasket member 114.

After the oval duct connector frame 10 is assembled as above described and secured to the end portion 106 of an oval duct, a pair of duct sections are positioned in abutting relation to each other with the inner vertical wall 28 of each frame 10 facing each other. A continuous gasket member 114 is positioned between the outer surface of the frame inner vertical wall 28 as illustrated in FIG. 15. The frame members 10 are fabricated so that the bolt apertures 84 in each of the connector pieces 26 are aligned with the opposite connector piece in the adjacent frame member. Bolts 116 are positioned through the apertures 84 and a nut 118 is connected to the threaded end. The gasket 114 preferably extends below the apertures 84 in the connector pieces 26. However, the gasket may extend upwardly as diagrammatically illustrated in FIG. 15 and the bolts 116 may be extended through the gasket material.

In a relaxed state where the adjacent frames 10 are in spaced relation to each other, the gasket has a generally rectangular configuration in section as illustrated in FIG. 15. When the nuts 118 are threaded onto the bolts 116, the connector pieces 26 and the frames 10 are moved toward each other to compress the gasket 114 therebetween to seal the connection between the respective ducts 106. It will be apparent from FIG. 15 that the gasket 114, which extends around the periphery of the frame members 10, will seal the respective frame members 10 by abutting the vertical outer surface of the inner vertical wall of the frame member.

The gap 112 formed in the frame member 10 by the connector pieces is also sealed by the gasket member 114. The sealing for the gap 112 is provided by the rearwardly displaced downwardly depending stop member 78 on the body portion of the connector piece 26. There is a gap where the wall 28 of the adjacent frame member sections terminate and the gasket member 114 extends over this gap 112. The edge portion 108 of the duct end portion 106 is urged into the distorted portion of the gasket member 114, as is illustrated in FIG. 16, to seal the duct edge portion 108 in the gap 112.

The offset depending stop members 78 also serves as a backing member for the gasket material to limit the distortion of the gasket material and force the gasket material downwardly and around the edge 108 of the duct end portion 106. FIG. 16 illustrates the nut 118 tightened on the bolt 116 to distort the gasket 114 and force the gasket both into sealing relation with the vertical walls 28 shown dotted in FIG. 16 and against the edge 108 of the duct end portion 106. With this arrangement, the end portions of oval ducts may be securely connected to each other simply by means of the bolts 116 extending through the apertures in the connector pieces 26.

Where the dimensions of the duct are such that there are sections of a frame member of extraordinary length, one or more clamps similar to the clamps illustrated in FIGS. 22-24 may be positioned around the rigidifying portions 44 of the frame members to further urge the frame members against the gasket 114. The clamps 86 are so dimensioned that they may be positioned on either the linear or arcuate frame sections to clamp the frame sections to each other.

It should be understood that in certain instances, the frame member 10 may be fabricated from more or less than the four sections illustrated in FIG. 9. For example, for certain dimensioned oval ducts, the arcuate sections 12 and 14 may have extended linear portions 20 and 22 and these linear portions are connected by connector pieces 26 to form a duct from two frame sections. Other configurations may be formed such as linear portions positioned in the arcuate sections 24 to form a oval duct with relatively short linear intermediate portions. The straight sections 16 and 18 may be form from a plurality of sections. Since the profile is formed by roll forming, the necessity of multiple intermediate straight sections should not be required. Separate shorter sections may be used however where it is desired to utilize the clamping forces exerted by the bolts 116 in the connector pieces. The above is illustrative of the versatility of forming the connector frames 10 from the described components and by the above described method.

Figure 17:
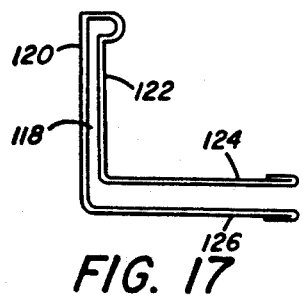
FIGS. 17–21 are examples of other suitable profile configurations for the frame portions of an oval duct connector.
Figure 18:
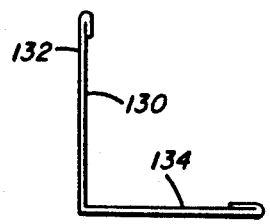
Figure 19:
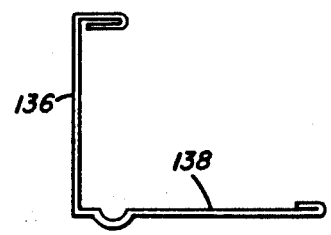
Figure 20:
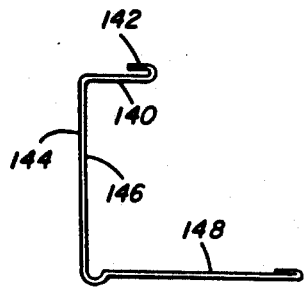
Figure 21:
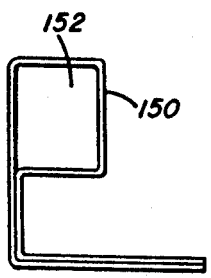

Although a specific profile for the frame sections is illustrated in FIGS. 12, 13, 15 and 16, it should be understood that other profiles could be used such as the profiles illustrated in FIGS. 17-21. In FIG. 17, the legs of the connector piece could be positioned in the opening 118 between the vertical members 120 and 122 and the end of the duct 106 could be positioned either on top of the flange 124 or between the flanges 124 and 126. Similarly, the angular profile illustrated in FIG. 18 could be utilized by connecting the connector piece leg portions to the inner wall 130 of the upstanding leg 132 and the end portion 106 of the duct positioned either on the upper surface or undersurface of the angular leg 134. In FIG. 19, the connector piece may be connected to the inner wall of the upper leg 136 and the duct to the upper or lower surface of the horizontal leg 138. In FIGS. 17-19, the rebent portions provide a rigidifying means for the frame member. Similarly in FIG. 20, a horizontal upper leg 140 with a rebent portion 142 extends from the vertical leg 144 to rigidify the frame member and permit the leg portions to be positioned in abutting relation with the inner wall 146 of vertical leg 144 and the duct end portion 106 may be secured to the upper or lower surface of the horizontally extending leg 148. In FIG. 21, the profile has a generally rectangular configuration that includes an opening 152 formed by a pair of vertical legs 150 to receive the leg portions 56 and 58 of the connector piece. It should be understood that the leg portions may have other configurations determined by the configuration of the receiver member. It should be understood that with these configurations above discussed, a gap is formed at the connector piece and the edge 108 of duct 106 extends upwardly beyond the lower stop means to provide sealing for the duct edge portion in the gap.

According to the provisions of the Patent Statutes, we have explained the principle, preferred construction and mode of operation of our invention and have illustrated what we now consider to represent its best embodiments. However, it should be understood that, within the scope of the appended claims, the invention may be practiced otherwise than as specifically illustrated and described.

We claim:

1. A duct connector for connecting oval duct sections having different transverse dimensions comprising:
    a pair of arcuate frame end sections having connecting end portion,
    a pair of intermediate linear frame sections having connecting end portion,
    a plurality of connector pieces each having a body portion and a pair of legs extending generally linearly therefrom, said connecting end portion of at least one of said arcuate frame end sections and said connecting end portion of at least one of said linear frame sections each having surfaces for receiving said connector piece legs to connect said arcuate frame end section to said linear frame section to form an oval frame,
    means positioned on said connector piece body portion for forming a gap between at least one of said arcuate frame end sections and at least one of said linear frame sections, said gap providing a range of relative movement between adjacently connected frame sections on said connector pieces to permit adjustments in the transverse dimension of said oval frame corresponding to variations in the transverse dimension of said oval duct sections, and
    means for connecting said oval frame to an end portion of an oval duct section with said gap compensating for said different transverse dimensions of said oval duct sections.

2. A duct connector as set forth in claim 1 in which,
    at least one of said means positioned on said connector pieces includes stop means to maintain said connecting end portion of said arcuate frame in spaced relation to said connecting end portion of said linear frame section and provide said gap between said respective connecting end portions, said oval duct section having an edge portion arranged to project into said gap between said respective connecting end portions.

3. A duct connector as set forth in claim 2 which includes,
    a portion of said stop means being displaced rearwardly from said body portion to permit said edge portion of said oval duct section in said gap to project forwardly beyond said stop means.

4. A duct connector as set forth in claim 1 in which,
    said arcuate frame end sections and said intermediate linear frame section having connecting end portions with a receiver opening therein,
    at least one of said connector pieces having a body portion and a pair of legs extending therefrom, said legs arranged to extend into said receiver openings and connect said respective connecting end portions of said respective frame section.

5. A duct connector for an oval duct as set forth in claim 4 in which,
    said receiver openings having a generally triangular configuration,
    said connector piece leg portions having an angular generally L shape, said connector piece leg portions dimensioned to fit into said receiver openings and rigidly connect said respective frame sections to each other.

6. A duct connector for an oval duct as set forth in claim 4 in which,
    each of said connector piece body portions having a securing means, said securing means arranged to be connected to a securing means of an adjacent oval duct connector to thereby connect adjacent duct connectors and the oval duct sections connected thereto.

7. A duct connector for an oval duct as set forth in claim 1 which includes,
    a plurality of clamp members extending around adjacent duct connector frame sections to thereby clampingly secure adjacent duct connectors and the oval duct sections secured thereto.

8. A duct connector as set forth in claim 1 in which,
    said arcuate frame end sections and said intermediate linear frame sections each include an inner vertical wall with a horizontal bottom flange extending therefrom, an outer vertical wall with a top horizontal flange extending therefrom,
    said top horizontal flange positioned in overlying relation with said bottom horizontal flange, and
    means for securing said duct end portion to said top and bottom horizontal flanges.

9. A duct connector as set forth in claim 18 in which,
    said arcuate frame end sections and said intermediate linear frame sections each include a rigidifying portion having an angular leg with a horizontal leg portion, and
    said horizontal leg portion extending substantially parallel to and spaced from said top horizontal flange to form a pocket therebetween.

10. Apparatus for connecting the end portions of a pair of oval duct sections comprising, a pair of duct connectors, each of said duct connectors having a plurality of frame sections with connecting end portions, means extending between and engaging adjacent connecting end portion for connecting said frame sections to each other to form an oval configuration, said connecting end portions being connected with at least one gap formed between at least a pair of end portions of said frame sections to provide a range of relative movement between adjacent connecting end portions to permit adjustments in the transverse dimension of said duct connectors to compensate for different transverse dimensions of said oval duct sections, means for connecting each duct connector to an end portion of an oval duct section, a gasket member positioned between said duct connectors and extending into said gaps, and means for connecting said duct connectors to each other with said gasket therebetween to thereby connect the end portions of a pair of oval duct sections.

11. Apparatus for connecting the end portions of a pair of oval duct sections as set forth in claim 10 in which, said means for connecting said frame sections includes connector pieces, said connecting end portions of said frame sections of each of said duct connectors including surfaces for receiving said connector pieces to connect adjacent connecting end portion to each other, said connector pieces having means for maintaining said connecting end portions of said frame sections in spaced relation to form said gap therebetween, and said gasket means member between said duct connectors extending into said gap and sealingly engaging the edge of said oval duct section in said gap.

12. Apparatus for connecting the end portions of a pair of oval ducts as set forth in claim 11 in which, said connector pieces include a body portion and a pair of legs extending generally linearly therefrom, said means connecting said duct connectors to each other including bolt means extending through said body portion of said connector pieces, said bolt means arranged to urge said duct connectors toward each other and compress said gasket member therebetween and urge said gasket member into said gap in sealing relation with said duct edge portion in said gap.

13. Apparatus for connecting the end portions of a pair of oval ducts as set forth in claim 11 in which, said connector piece includes a body portion with stop means thereon, said stop means having an offset portion in said gap to permit said gasket means to extend into said gap and sealingly engage the edge of said oval duct in said gap.

14. A duct connector for connecting oval duct sections having different transverse dimensions comprising, a plurality of frame sections, each frame section having connecting end portions, connector pieces having means for engaging adjacently positioned connecting end portions to connect said connecting end portions of said frame sections to form a frame having an oval configuration, said connector pieces having a body portion and means for maintaining said connecting end portions in spaced relation and form a gap therebetween, said gap providing a range of relative movement between adjacently connected frame sections on said connector pieces to permit adjustments in the transverse dimension of said frame having an oval configuration corresponding to variations in the transverse dimensions of said oval duct sections, and means for comprising said frame to an end portion of a duct with portions of said duct end portion extending into said gaps formed on said connector pieces.

15. A duct connector for an oval duct as set forth in claim 14 in which, a gasket member positioned in contact with said frame and extending around said duct end portion, and said means for maintaining said connecting end portions in spaced relation includes an offset portion to permit the duct end portion to extend into said gap and into sealing relation with said gasket member.

16. A duct connector for connecting oval duct sections having different transverse dimensions comprising:

at least a pair of frame sections each having a linear portion and at least one arcuate end portion, each of said frame sections having at least a pair of connecting end portions, a plurality of connector pieces having means for engaging adjacent connecting end portions to connect adjacent connecting end portions of said pair of frame sections to form a duct connector, means positioned on said means for engaging adjacent connecting end portions for connecting said connecting end portions in spaced relation to form a gap between said connecting end portions, said gap providing a range of relative movement between adjacently connected connecting end portions on said connector pieces to permit adjustments in the transverse dimension of said duct connector corresponding to variations in the transverse dimension of said oval duct section, and means for connecting the end portion of an oval duct section to said connecting frame sections.

17. A duct connector for an oval duct as set forth in claim 14 in which, said frame sections having a generally triangular profile with a vertical leg, a horizontal leg and an angular leg, said triangular profile forming a triangular opening therein, said horizontal leg having an end portion and said angular leg having an end portion extending in parallel relation to said horizontal leg end portion, and said duct end portion arranged to extend between said profile end portions and into said triangular opening in abutting relation with the inner surface of said vertical leg.

18. A duct connector for an oval duct as set forth in claim 17 in which, said triangular profile includes a protrusion adjacent the juncture of said vertical leg and said angular leg to form a clamping surface for a clamping device.

* * * * *